(12) United States Patent
Yamamoto (10) Patent No.: US 9,932,040 B2
(45) Date of Patent: Apr. 3, 2018

(54) HYBRID CAR

(71) Applicant: Toyota Jidosha Kabushiki Kaisha, Toyota-shi, Aichi-ken (JP)

(72) Inventor: Masaya Yamamoto, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 90 days.

(21) Appl. No.: 15/135,592

(22) Filed: Apr. 22, 2016

(65) Prior Publication Data

US 2016/0311439 A1 Oct. 27, 2016

(30) Foreign Application Priority Data

Apr. 23, 2015 (JP) ................. 2015-088259

(51) Int. Cl.
| | |
|---|---|
| *B60W 10/04* | (2006.01) |
| *B60W 10/08* | (2006.01) |
| *B60W 10/16* | (2012.01) |
| *B60W 30/20* | (2006.01) |
| *B60K 6/365* | (2007.10) |
| *B60K 6/445* | (2007.10) |
| *B60W 30/18* | (2012.01) |
| *B60W 10/10* | (2012.01) |

(Continued)

(52) U.S. Cl.
CPC ............ *B60W 30/20* (2013.01); *B60K 6/365* (2013.01); *B60K 6/445* (2013.01); *B60W 10/08* (2013.01); *B60W 10/10* (2013.01); *B60W 10/16* (2013.01); *B60W 30/18054* (2013.01); *B60K 6/547* (2013.01); *B60K 2023/043* (2013.01); *B60K 2741/08* (2013.01); *B60W 2030/206* (2013.01); *Y02T 10/6239* (2013.01); *Y10S 903/91* (2013.01); *Y10S 903/919* (2013.01)

(58) Field of Classification Search
CPC ........................ B60W 30/20; B60W 2030/206
See application file for complete search history.

(56) References Cited

U.S. PATENT DOCUMENTS

| | | |
|---|---|---|
| 2004/0142790 A1 | 7/2004 | Tomura et al. |
| 2007/0200424 A1 | 8/2007 | Sakai |

(Continued)

FOREIGN PATENT DOCUMENTS

| | | |
|---|---|---|
| JP | 2004-222439 A | 8/2004 |
| JP | 2007-230255 A | 9/2007 |

(Continued)

*Primary Examiner* — Kimberly S Berona
*Assistant Examiner* — Anshul Sood
(74) *Attorney, Agent, or Firm* — Dinsmore & Shohl LLP (57) ABSTRACT

A hybrid car includes an engine, a first motor, a second motor, a planetary gear, a disconnecting mechanism, and an electronic control unit. The electronic control unit is configured to control the engine and the first motor such that the first motor gives the engine a damping torque of the same phase as a pulsating component of a torque of the engine and the first motor starts the engine by cranking the engine when the engine is started with the shift position being the position for traveling. The electronic control unit is configured to control the engine and the first motor such that the first motor starts the engine by cranking the engine without the first motor giving the engine the damping torque of the same phase when the engine is started with the shift position being the position for non-traveling.

3 Claims, 9 Drawing Sheets

(51) Int. Cl.
*B60K 23/04* (2006.01)
*B60K 6/547* (2007.10)

(56) References Cited

U.S. PATENT DOCUMENTS

2012/0239237 A1* 9/2012 Hashimoto ............ B60K 6/365
                                                            701/22
2013/0332017 A1* 12/2013 Hisano ................ B60W 20/106
                                                            701/22

FOREIGN PATENT DOCUMENTS

| JP | 2007-276594 A | 10/2007 |
| JP | 2010-064563 A | 3/2010 |
| JP | 2013-129260 A | 7/2013 |

\* cited by examiner

|      | C1 | C2 | B1 | B2 |
|------|----|----|----|----|
| 1st  | O  | -  | -  | O  |
| 2nd  | O  | -  | O  | -  |
| 3rd  | O  | O  | -  | -  |
| 4th  | -  | O  | O  | -  |
| R.   | O  | -  | -  | O  |
| N.P  | -  | -  | -  | -  |

※ "O": ENGAGED, "-": RELEASED

HYBRID CAR

CROSS-REFERENCE TO RELATED APPLICATIONS

The present disclosure claims priority to Japanese Patent Application No. 2015-088259 filed on Apr. 23, 2015, which incorporated herein by reference in its entirety including the specification, drawings and abstract.

BACKGROUND

1. Technical Field

The present disclosure relates to a hybrid car.

2. Description of Related Art

As a hybrid car, a hybrid car in which an engine, a motor generator, and a driving wheel and an electric motor are configured to be connected to three shafts of a power split mechanism and a braking force is given to a vehicle wheel by a braking device when the engine is started in a case where a shift position is a non-traveling position while the hybrid car is stopped is disclosed (for example, refer to Japanese Patent Application Publication No. 2007-230255). In this hybrid car, a vibration of the vehicle during the start of the engine is suppressed by the control described above.

SUMMARY in some of this type of hybrid cars, a configuration that performs connection and disconnection between an intermediate shaft and a driving shaft (such as a clutch and a transmission) is disposed between the intermediate shaft to which the electric motor is connected and the driving shaft which is connected to the driving wheel, the intermediate shaft and the driving shaft being two of the three shafts of the power split mechanism. Basically, in this case, the intermediate shaft and the driving shaft are connected to each other when the shift position is a traveling position and the intermediate shaft and the driving shaft are disconnected from each other when the shift position is not the traveling position. Accordingly, vibration transmission characteristics during the start of the engine at a time when the shift position is the traveling position and vibration transmission characteristics during the start of the engine at a time when the shift position is the non-traveling position differ from each other. Accordingly, the vibration that is generated in the vehicle might rather be amplified when the same damping control that is performed when the engine is started with the shift position being the non-traveling position is performed while a damping control is performed by the motor generator when the engine is started with the shift position being the position for traveling.

The present disclosure provides a hybrid car that suppresses a relative increase in a vibration which is generated in a vehicle when an engine is started with a shift position being a position for non-traveling.

A hybrid car according to an aspect of the present disclosure includes an engine, a first motor, a second motor, a planetary gear, a disconnecting mechanism, and an electronic control unit. The first motor is configured to input and output power. The second motor is configured to input and output power to and from an intermediate shaft. The planetary gear has three rotating elements each connected to a rotary shaft of the first motor, an output shaft of the engine, and the intermediate shaft. The planetary gear is configured such that the rotary shaft, the output shaft, and the intermediate shaft are arranged in the order of the rotary shaft, the output shaft, and the intermediate shaft in a nomogram of the planetary gear. The disconnecting mechanism is configured to execute connection and disconnection between the intermediate shaft and a driving shaft connected to an axle. The electronic control unit is configured to control the disconnecting mechanism such that the intermediate shaft and the driving shaft are connected to each other when a shift position is a position for traveling. The electronic control unit is configured to control the disconnecting mechanism such that the intermediate shaft and the driving shaft are disconnected from each other when the shift position is a position for non-traveling. The electronic control unit is configured to control the engine and the first motor such that the first motor gives the engine a damping torque of the same phase as a pulsating component of a torque of the engine and the first motor starts the engine by cranking the engine when the engine is started with the shift position being the position for traveling. The electronic control unit is configured to control the engine and the first motor such that the first motor starts the engine by cranking the engine without the first motor giving the engine the damping torque of the same phase when the engine is started with the shift position being the position for non-traveling.

According to the hybrid car of the above-described aspect, the disconnecting mechanism is controlled such that the intermediate shaft and the driving shaft are connected to each other when the shift position is the position for traveling and the disconnecting mechanism is controlled such that the intermediate shaft and the driving shaft are disconnected from each other when the shift position is the position for non-traveling. Examples of the "position for traveling" include a position for forward traveling and a position for reverse traveling, and examples of the "position for non-traveling" include a parking position and a neutral position. When the engine is started with the shift position being the position for traveling, the damping torque of the same phase as the pulsating component of the torque of the engine is given by the first motor and the engine and the first motor are controlled such that the engine is cranked and started by the first motor. When the engine is started with the shift position being the position for non-traveling, the engine and the first motor are controlled such that the engine is cranked and started by the first motor without the damping torque of the same phase as the pulsating component of the torque of the engine being given.

When the shift position is the position for traveling, the intermediate shaft and the driving shaft are connected to each other and a vibration that is attributable to torque pulsations of the engine, the first motor, and the second motor at a time when the engine is started (hereinafter, referred to as a "predetermined vibration") is transmitted via a path from the intermediate shaft to the axle (hereinafter, referred to as a "drive line") and is transmitted via a path by a case, a mount, a suspension portion, and the like (hereinafter, referred to as a "power plant"). In this case, the vibration via the drive line is more likely to appear as a vehicle vibration than the vibration via the power plant. In the hybrid car according to the present disclosure, the damping torque of the same phase as the pulsating component of the torque of the engine is given by the first motor when the engine is started with the shift position being the position for traveling, and thus a rotation of the intermediate shaft can be suppressed by a distortion of a part between the first motor and the engine (each rotary shaft or the like) being suppressed. As a result, the vibration via the drive line can be suppressed and a relative increase in the vibration generated in a vehicle can be suppressed.

When the shift position is the position for non-traveling, the intermediate shaft and the driving shaft are disconnected from each other and the predetermined vibration is transmitted only via the power plant without being transmitted via the drive line. In other words, a main transmission path with respect to the predetermined vibration at a time when the shift position is the position for traveling and a main transmission path with respect to the predetermined vibration at a time when the shift position is the position for non-traveling differ from each other. Accordingly, when the damping torque of the same phase as the pulsating component of the torque of the engine is given by the first motor as in a case where the shift position is the position for traveling, the vibration that is generated in the vehicle might rather increase. In the hybrid car according to the present disclosure, the damping torque of the same phase as the pulsating component of the torque of the engine is not given by the first motor when the engine is started with the shift position being the position for non-traveling, and thus the relative increase in the vibration that is generated in the vehicle can be suppressed.

In the hybrid car according to the aspect described above, the electronic control unit may be configured to control the engine and the first motor such that the first motor gives the engine a damping torque opposite in phase to the pulsating component of the torque of the engine and the first motor starts the engine by cranking the engine when the engine is started with the shift position being the position for non-traveling. According to the hybrid car of this aspect, the relative increase in the vibration that is generated in the vehicle can be further suppressed when the engine is started with the shift position being the position for non-traveling.

In the hybrid car according to the aspect the present disclosure in which the damping torque of the same phase as the pulsating component of the torque of the engine is given by the first motor when the engine is started with the shift position being the position for traveling and the damping torque opposite in phase to the pulsating component of the torque of the engine is given by the first motor when the engine is started with the shift position being the position for non-traveling, the damping torque of the same phase may satisfy Equation (A) and the damping torque of the opposite phase may satisfy Equation (B).

$$Tm1v = \left(\frac{1+\rho}{\rho} \cdot \frac{Im1}{Ie}\right) \cdot Tev \quad (A)$$

$$Tm1v = -Tev \quad (B)$$

Herein, $\rho$ is a gear ratio of the planetary gear, Ie is a moment of inertia of the engine, Im1 is a moment of inertia of the first motor, Tev is the pulsating component of the torque of the engine, and Tm1v is the damping torque of the same phase or the opposite phase of the first motor.

In the hybrid car according to the aspect described above, the electronic control unit may be configured to control the first motor and the second motor such that the first motor outputs a torque equivalent to a sum of a basic torque for cranking the engine and the damping torque of the same phase and the second motor outputs a cancel torque for cancelling a torque acting on the intermediate shaft in accordance with the basic torque from the first motor when the engine is started with the shift position being the position for traveling. The electronic control unit may be configured to control the first motor and the second motor such that the first motor outputs a torque equivalent to a sum of the basic torque and the damping torque of the opposite phase and the second motor outputs the cancel torque when the engine is started with the shift position being the position for non-traveling.

In the corresponding hybrid car described above, the disconnecting mechanism may be a stepped transmission interposed between the intermediate shaft and the driving shaft, in addition, the disconnecting mechanism may be a clutch that performs connection and disconnection between the intermediate shaft and the driving shaft.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described based on an example.

Figure 1:
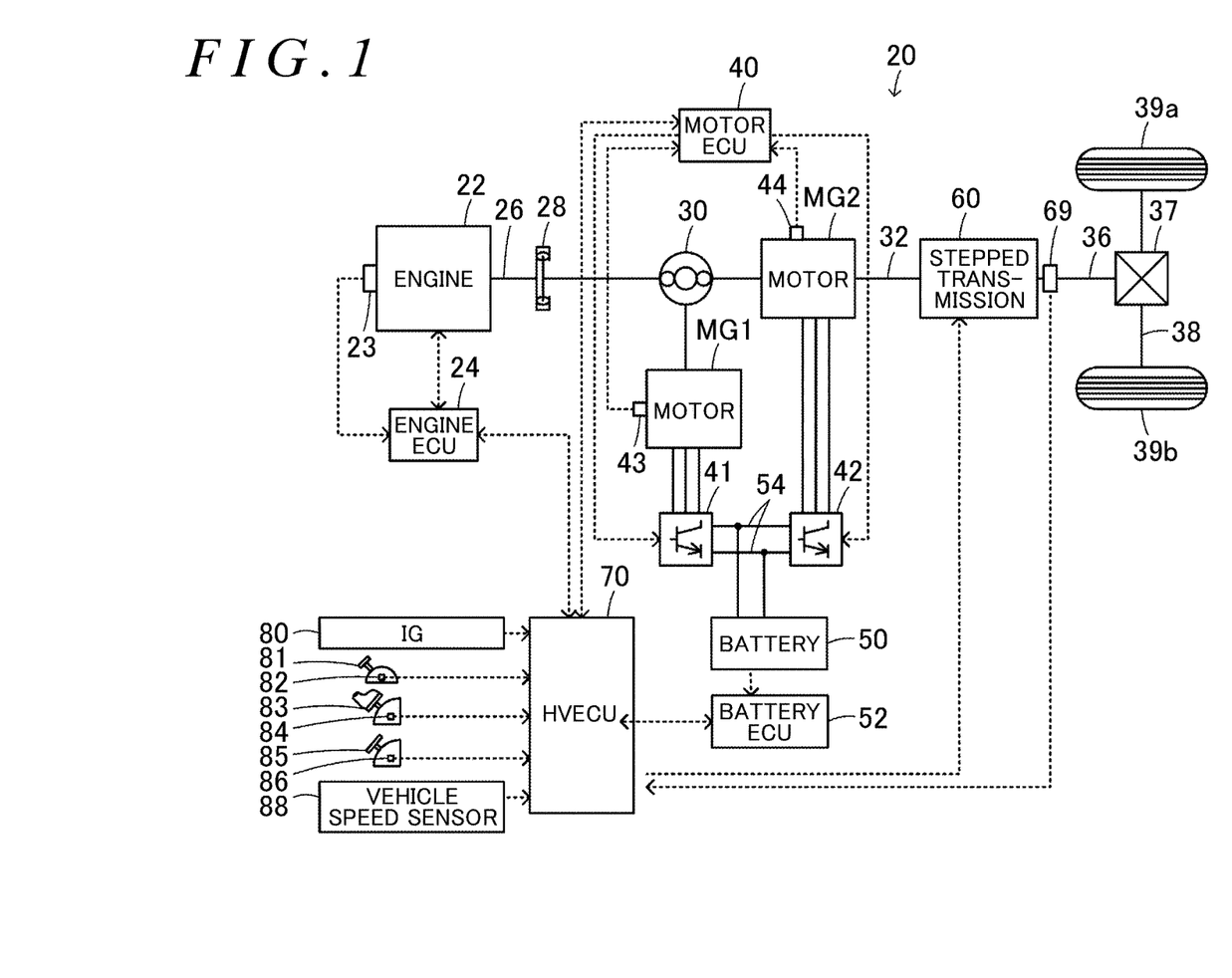
FIG. 1 is a configuration diagram illustrating a schematic configuration of a hybrid car 20 according to an example of the present disclosure.
Figure 2:
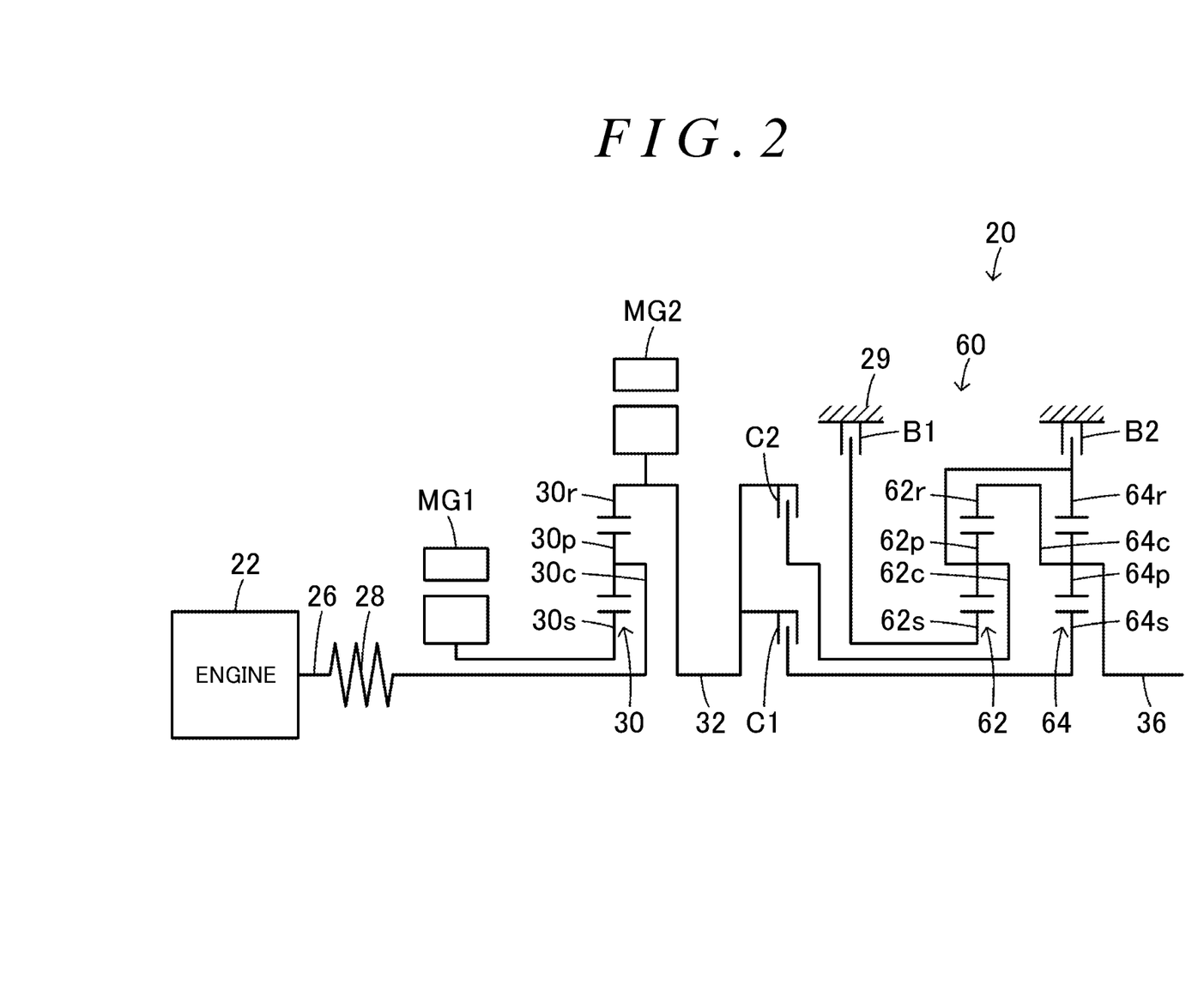
FIG. 2 is a connection relationship diagram illustrating a connection relationship among respective elements that constitute the hybrid car 20.

FIG. 1 is a configuration diagram illustrating a schematic configuration of a hybrid car 20 according to the example of the present disclosure, and FIG. 2 is a connection relationship diagram illustrating a connection relationship among respective elements that constitute the hybrid car 20. As illustrated in FIGS. 1 and 2, the hybrid car 20 according to the example is provided with an engine 22, a planetary gear 30, motors MG1, MG2, inverters 41, 42, a stepped transmission 60, a battery 50, and an electronic control unit for hybrid (hereinafter, referred to as a "HVECU") 70.

The engine 22 is configured as a four-cylinder internal combustion engine that outputs power by the four strokes of intake, compression, expansion, and exhaust strokes by using a fuel such as gasoline and light oil. An operation of the engine 22 is controlled by an electronic control unit for the engine (hereinafter, referred to as an "engine ECU") 24.

The engine ECU 24 is configured as a microprocessor (not illustrated) that has a CPU as its center. The engine ECU 24 is provided with a ROM in which a processing program is stored, a RAM that temporarily stores data, input and output ports, and a communication port as well as the CPU. Signals from various sensors that are required to control the operation of the engine 22 are input to the engine ECU 24 from the input port. Examples of the signals from the various sensors can include the followings. •A crank angle $\theta e$ from a crank position sensor 23 that detects a rotational position of a crankshaft 26 of the engine 22. •A throttle opening degree TH from a throttle valve position sensor that detects a position of a throttle valve.

Various control signals for controlling the operation of the engine 22 are output via the output port from the engine ECU 24. Examples of the various control signals can include the followings. •A driving control signal toward a fuel injection valve. •A driving control signal toward a throttle motor that regulates the position of the throttle valve. •A driving control signal toward an ignition coil that is integrated with an igniter.

The engine ECU 24 is connected to the HVECU 70 via the communication port. The engine ECU 24 controls the operation of the engine 22 in accordance with a control signal from the HVECU 70. In addition, the engine ECU 24 outputs data relating to an operation state of the engine 22 to the HVECU 70 if necessary. The engine ECU 24 calculates a rotation speed of the crankshaft 26, that is, a rotation speed Ne of the engine 22 based on the crank angle $\theta e$ from the crank position sensor 23.

The planetary gear 30 is configured as a single pinion-type planetary gear mechanism. The planetary gear 30 has a sun gear $30s$ that is an external gear, a ring gear $30r$ that is an internal gear which is placed concentrically with the sun gear $30s$, a plurality of pinion gears $30p$ that mesh respectively with the sun gear $30s$ and the ring gear $30r$, and a carrier $30c$ that holds the plurality of pinion gears $30p$ to be capable of spinning (rotation) and revolution. The sun gear $30s$ is connected to a rotor of the motor MG1, the ring gear $30r$ is connected to an intermediate shaft 32 (input shaft of the stepped transmission 60), and the carrier $30c$ is connected to the crankshaft 26 of the engine 22 via a damper 28.

The motor MG1 is configured as, for example, a synchronous generator motor. As described above, the rotor of the motor MG1 is connected to the sun gear of the planetary gear 30. The motor MG2 is configured as, for example, a synchronous generator motor. A rotor of the motor MG2 is connected to the intermediate shaft 32. The inverters 41, 42 are connected to an electric power line 54 with the battery 50. The motors MG1, MG2 are driven to rotate as a plurality of switching elements (not illustrated) of the inverters 41, 42 are subjected to a switching control by an electronic control unit for the motor (hereinafter, referred to as a "motor ECU") 40.

The motor ECU 40 is configured as a microprocessor (not illustrated) that has a CPU as its center. The motor ECU 40 is provided with a ROM in which a processing program is stored, a RAM that temporarily stores data, input and output ports, and a communication port as well as the CPU. Signals from various sensors that are required to control the driving of the motors MG1, MG2 are input to the motor ECU 40 via the input port. Examples of the signals from the various sensors can include the followings. •Rotational positions $\theta m1$, $\theta m2$ from rotational position detection sensors 43, 44 that detect rotational positions of the rotors of the motors MG1, MG2. •A phase current from a current sensor that detects a current flowing through each phase of the motors MG1, MG2.

Switching control signals toward the switching elements (not illustrated) of the inverters 41, 42 and the like are output via the output port from the motor ECU 40. The motor ECU 40 is connected to the HVECU 70 via the communication port. The motor ECU 40 controls the driving of the motors MG1, MG2 in accordance with a control signal from the HVECU 70. In addition, the motor ECU 40 outputs data relating to driving states of the motors MG1, MG2 to the HVECU 70 if necessary. The motor ECU 40 calculates rotation speeds Nm1, Nm2 of the motors MG1, MG2 based on the rotational positions $\theta m1$, $\theta m2$ of the rotors of the motors MG1, MG2 from the rotational position detection sensors 43, 44.

The stepped transmission 60 is configured as a four-speed transmission that is interposed between the intermediate shaft 32 and a driving shaft 36 which is connected to driving wheels $39a$, $39b$ via an axle 38 and a differential gear 37. This stepped transmission 60 transmits power of the intermediate shaft 32 to the driving shaft 36 after shifting the power in four stages and disconnects the intermediate shaft 32 and the driving shaft 36 from each other (cancels the power transmission between the intermediate shaft 32 and the driving shaft 36).

This stepped transmission 60 is provided with two single pinion-type planetary gears 62, 64 along with two clutches C1, C2 and two brakes B1, B2 as a plurality of engaging elements.

The planetary gear 62 has a sun gear $62s$ that is an external gear, a ring gear $62r$ that is an internal gear which is placed concentrically with the sun gear $62s$, a plurality of pinion gears $62p$ that mesh respectively with the sun gear $62s$ and the ring gear $62r$, and a carrier $62c$ that holds the plurality of pinion gears $62p$ to be capable of spinning (rotation) and revolution.

The planetary gear 64 has a sun gear $64s$ that is an external gear, a ring gear $64r$ that is an internal gear which is placed concentrically with the sun gear $64s$, a plurality of pinion gears $64p$ that mesh respectively with the sun gear $64s$ and the ring gear $64r$, and a carrier $64c$ that holds the plurality of pinion gears $64p$ to be capable of spinning (rotation) and revolution.

The carrier $62c$ of the planetary gear 62 and the ring gear $64r$ of the planetary gear 64 are connected (fixed) to each other, and the ring gear $62r$ of the planetary gear 62 and the carrier $64c$ of the planetary gear 64 are connected to each other. Accordingly, the planetary gear 62 and the planetary gear 64 function as so-called four element-type mechanisms that use the sun gear $62s$ of the planetary gear 62, the carrier $62c$ of the planetary gear 62 and the ring gear $64r$ of the planetary gear 64, the ring gear $62r$ of the planetary gear 62 and the carrier $64c$ of the planetary gear 64, and the sun gear $64s$ of the planetary gear 64 as four rotating elements. In addition, the ring gear $62r$ of the planetary gear 62 and the carrier 64c of the planetary gear 64 are connected to the driving shaft 36 (output shaft of the stepped transmission 60).

The clutch C1 connects the intermediate shaft 32 and the sun gear 64s of the planetary gear 64 to each other and disconnects the intermediate shaft 32 and the sun gear 64s of the planetary gear 64 from each other. The clutch C2 connects the intermediate shaft 32 to the carrier 62c of the planetary gear 62 and the ring gear 64r of the planetary gear 64 and disconnects the intermediate shaft 32 from the carrier 62c of the planetary gear 62 and the ring gear 64r of the planetary gear 64. The brake B1 non-rotatably fixes (connects) the sun gear 62s of the planetary gear 62 to a transmission case 29 as a stationary member and rotatably releases this sun gear 62s from the transmission case 29. The brake B2 non-rotatably fixes (connects) the carrier 62c of the planetary gear 62 and the ring gear 64r of the planetary gear 64 to the transmission case 29 and rotatably releases the carrier 62c and the ring gear 64r from the transmission case 29. The clutches C1, C2 and the brakes B1, B2 are operated in response to hydraulic oil supply and discharge by a hydraulic control device (not illustrated).

Figure 3:
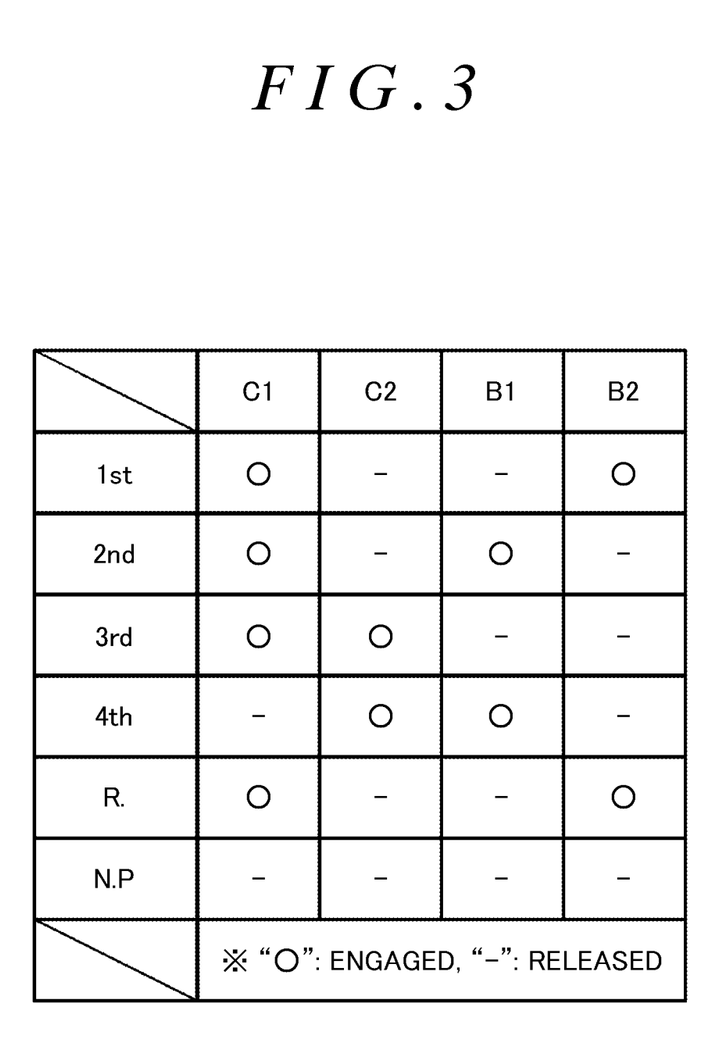
FIG. 3 is an operation table illustrating a relationship between each gearshift stage of a stepped transmission 60 and operation states of clutches C1, C2 and brakes B1, B2.

FIG. 3 is an operation table illustrating a relationship between each gearshift stage of the stepped transmission 60 and operation states of the clutches C1, C2 and the brakes B1, B2. When a shift position SP is a position for traveling (drive position or reverse position), the stepped transmission 60 forms forward gears of a first speed to a fourth speed and a reverse gear as follows. The forward first speed and the reverse gear are formed by the clutch C1 and the brake B2 being engaged and the clutch C2 and the brake B1 being released. The forward second speed is formed by the clutch C1 and the brake B1 being engaged and the clutch C2 and the brake B2 being released. The forward third speed is formed by the clutch C1 and the clutch C2 being engaged and the brakes B1, B2 being released. The forward fourth speed is formed by the clutch C2 and the brake B1 being engaged and the clutch C1 and the brake B2 being released. In addition, when the shift position SP is a position for non-traveling (neutral position or parking position), the stepped transmission 60 disconnects the intermediate shaft 32 and the driving shaft 36 from each other by releasing all the clutches C1, C2 and brakes B1, B2 (cancels the power transmission between the intermediate shaft 32 and the driving shaft 36).

The battery 50 is configured as, for example, a lithium-ion secondary battery or a nickel-hydrogen secondary battery. This battery 50 is connected to the electric power line 54 with the inverters 41, 42 as described above. The battery 50 is managed by an electronic control unit for the battery (hereinafter, referred to as a "battery ECU") 52.

The battery ECU 52 is configured as a microprocessor (not illustrated) that has a CPU as its center. The battery ECU 52 is provided with a ROM in which a processing program is stored, a RAM that temporarily stores data, input and output ports, and a communication port as well as the CPU. Signals from various sensors that are required for the management of the battery 50 are input to the battery ECU 52 via the input port. Examples of the signals from the various sensors can include the followings. •A battery voltage Vb from a voltage sensor that is installed between terminals of the battery 50. •A battery current Ib from a current sensor that is attached to the output terminal of the battery 50. •A battery temperature Tb from a temperature sensor that is attached to the battery 50.

The battery ECU 52 is connected to the HVECU 70 via the communication port. The battery ECU 52 outputs data relating to a state of the battery 50 to the HVECU 70 if necessary. The battery ECU 52 calculates an electric power storage ratio SOC based on an integrated value of the battery current Ib from the current sensor. The electric power storage ratio SOC is a ratio of a capacity of electric power that can be discharged from the battery 50 to a full capacity of the battery 50.

The HVECU 70 is configured as a microprocessor (not illustrated) that has a CPU as its center. The HVECU 70 is provided with a ROM in which a processing program is stored, a RAM that temporarily stores data, input and output ports, and a communication port as well as the CPU. Signals from various sensors are input to the HVECU 70 via the input port. Examples of the signals from the various sensors can include the followings. •A rotation speed Nout of the driving shaft 36 from a rotation speed sensor 69 that detects a rotation speed of the driving shaft 36. •An ignition signal from an ignition switch 80. •The shift position SP from a shift position sensor 82 that detects an operation position of a shift lever 81. •An accelerator opening degree Acc from an accelerator pedal position sensor 84 that detects the amount of depression of an accelerator pedal 83. •A brake pedal position BP from a brake pedal position sensor 86 that detects the amount of depression of a brake pedal 85. •A vehicle speed V from a vehicle speed sensor 88.

A control signal toward the stepped transmission 60 (hydraulic control device) or the like is output from the HVECU 70 via the output port. The HVECU 70 is connected to the engine ECU 24, the motor ECU 40, and the battery ECU 52 via the communication port as described above, and exchanges various control signals and data with the engine ECU 24, the motor ECU 40, and the battery ECU 52.

In the hybrid car 20 according to the example, the parking position (P position) that is used for parking, the reverse position (R position) for reverse traveling, the neutral position (N position), the drive position (D position) for forward traveling, and the like are prepared as the operation position of the shift lever 81 (shift position SP detected by the shift position sensor 82).

In the hybrid car 20 according to the example that has the above-described configuration, a required driving force of the driving shaft 36 is set based on the accelerator opening degree Acc and the vehicle speed V when the shift position SP is the position for traveling (drive position or reverse position) by a cooperative control of the HVECU 70, the engine ECU 24, and the motor ECU 40 and the operation of the engine 22 and operations of the motors MG1, MG2 are controlled such that a required power which is commensurate with the required driving force is output to the driving shaft 36. The engine 22 and the motors MG1, MG2 have the following modes of (1) to (3) as their operation modes. (1) Torque conversion operation mode: a mode in which the operation of the engine 22 is controlled such that power corresponding to the required power is output from the engine 22 and the driving of the motors MG1, MG2 is controlled such that the entire power output from the engine 22 is subjected to a torque conversion by the planetary gear 30 and the motors MG1, MG2 and the required power is output to the driving shaft 36 via the stepped transmission 60 (2) Charging and discharging operation mode: a mode in which the operation of the engine 22 is controlled such that power commensurate with the sum of the required power and electric power required for charging and discharging of the battery 50 is output from the engine 22 and the driving of the motors MG1, MG2 is controlled such that the entire power output from the engine 22 or a part of the power output from the engine 22 is subjected to the torque conversion by the planetary gear 30 and the motors MG1, MG2 with the charging and discharging of the battery 50 and the required power is output to the driving shaft 36 via the stepped transmission 60 (3) Motor operation mode: a mode in which the driving of the motor MG2 is controlled such that the required power is output to the driving shaft 36 via the stepped transmission 60 with the operation of the engine 22 stopped.

In addition, in the hybrid car 20 according to the example, the HVECU 70 controls the stepped transmission 60, such that the gearshift stage of the stepped transmission 60 becomes a gearshift stage (forward first speed to forward fourth speed) corresponding to the required driving force of the driving shaft 36 and the vehicle speed V, when the shift position SP is the drive position. Furthermore, when the shift position SP is the reverse position, the stepped transmission 60 is controlled such that the gearshift stage of the stepped transmission 60 becomes the reverse gear. Moreover, when the shift position SP is the neutral position or the parking position, the stepped transmission 60 is controlled such that the intermediate shaft 32 and the driving shaft 36 are disconnected from each other.

Figure 4A:
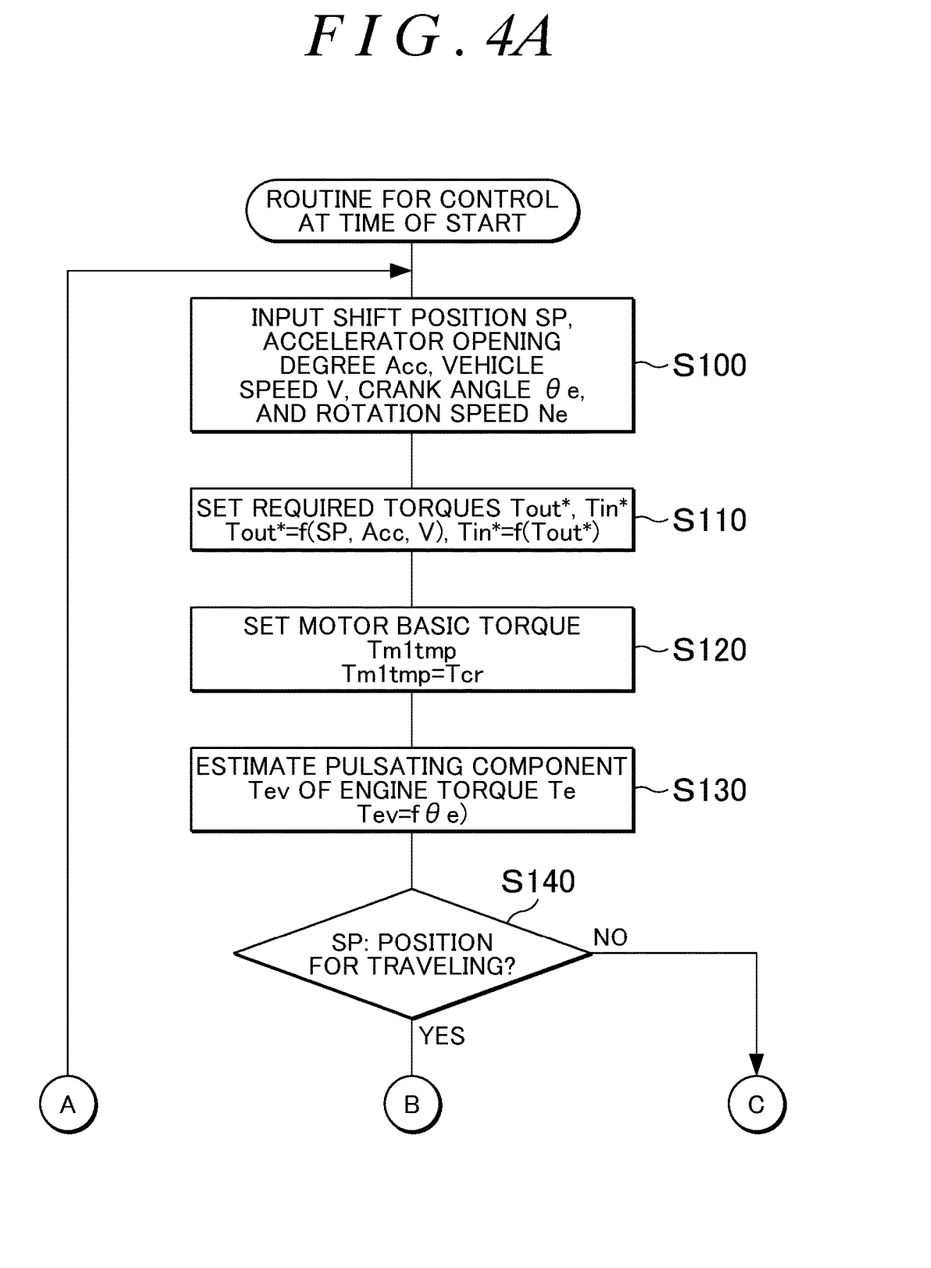
FIG. 4A and FIG. 4B are flowcharts illustrating an example of a routine for a control at a time of a start that is executed by a HVECU 70 according to the example.
Figure 4B:
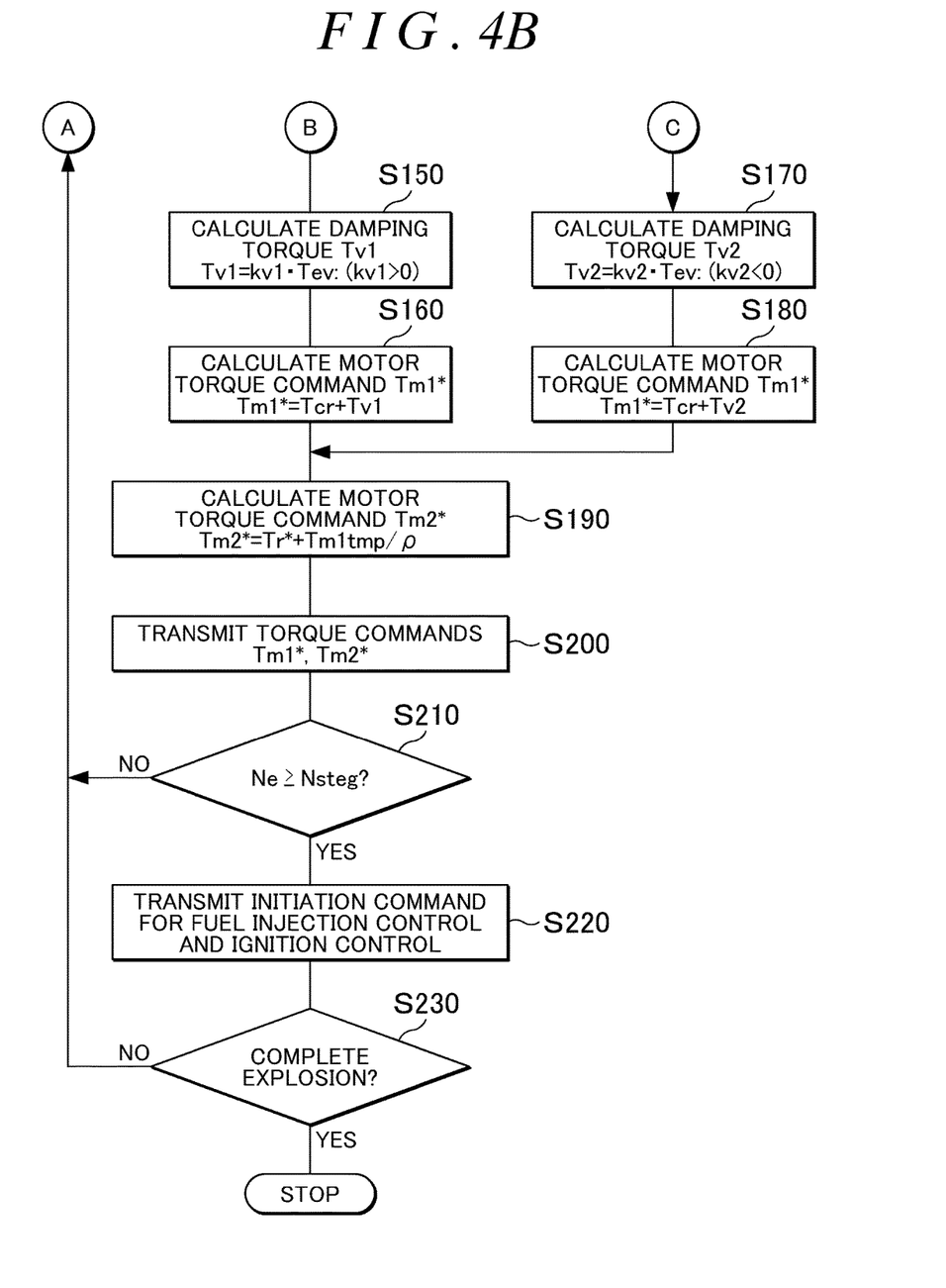

Hereinafter, an operation of the hybrid car 20 according to the example that has the above-described configuration, an operation at a time when the engine 22 is cranked and started by the motor MG1 in particular, will be described. FIG. 4A and FIG. 4B are flowcharts illustrating an example of a routine for a control at a time of the start that is executed by the HVECU 70 according to the example. This routine is executed when the engine 22 is instructed to be started.

Once the routine for the control at the time of the start is executed, the HVECU 70 first inputs data required for the control (Step S100) such as the shift position SP, the accelerator opening degree Acc, the vehicle speed V, and the crank angle θe and the rotation speed Ne of the engine 22. Herein, a value (position) that is detected by the shift position sensor 82 is input as the shift position SP. A value that is detected by the accelerator pedal position sensor 84 is input as the accelerator opening degree Acc. A value that is detected by the vehicle speed sensor 88 is input as the vehicle speed V. A value that is detected by the crank position sensor 23 is input, by communication, as the crank angle θe of the engine 22. A value that is calculated by the engine ECU 24 is input, by communication, as the rotation speed Ne of the engine 22.

After the data input, a required torque Tout* that is required for the driving shaft 36 and a required torque Tin* that is required for the intermediate shaft 32 are set (Step S110). When the shift position SP is the position for traveling (drive position or reverse position), the required torque Tout* of the driving shaft 36 is set based on the shift position SP, the accelerator opening degree Acc, and the vehicle speed V and the required torque Tin* of the intermediate shaft 32 is calculated by the required torque Tout* of the driving shaft 36 being divided by a gear ratio Gr of the stepped transmission 60. In this case, the required torque Tout* can be set by the shift position SP, the accelerator opening degree Acc, and the vehicle speed V being applied to a relationship among the shift position SP, the accelerator opening degree Acc, the vehicle speed V, and the required torque Tout* that is determined in advance. In addition, the gear ratio Gr of the stepped transmission 60 can be calculated by a rotation speed Nin of the intermediate shaft 32 (rotation speed Nm2 of the motor MG2) being divided by the rotation speed Nout of the driving shaft 36. When the shift position SP is the position for non-traveling (neutral position or parking position), a value of 0 may be set to the required torque Tout* of the driving shaft 36 and the required torque Tin* of the intermediate shaft 32 during the non-traveling.

Figure 5:
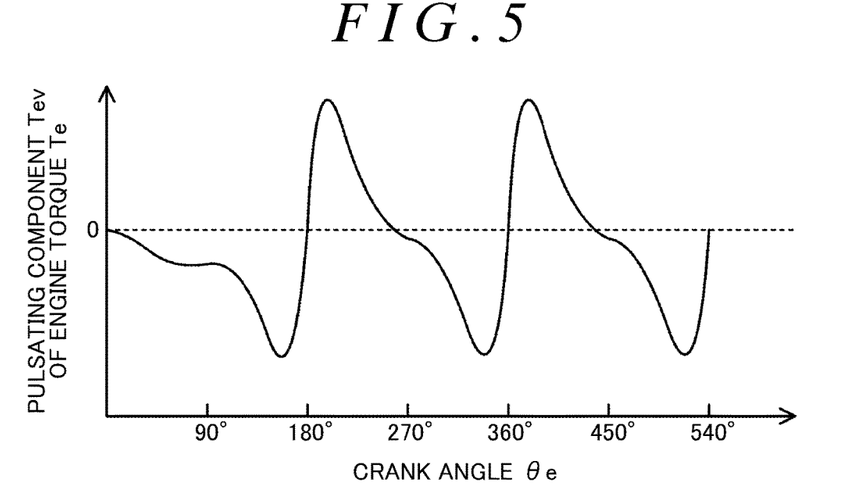
FIG. 5 is an explanatory drawing illustrating an example of a relationship between a crank angle θe and a pulsating component Tev at an initial crank angle θe of 0°.

Then, a cranking torque Tcr for the cranking of the engine 22 is set to a basic torque Tm1$tmp$ as a base value of a torque command Tm1* of the motor MG1 (Step S120). Then, a pulsating component Tev of a torque Te of the engine 22 is estimated (Step S130). The pulsating component Tev of the torque Te of the engine 22 is set by the pulsating component Tev corresponding to a given initial crank angle θeset and the given crank angle θe being derived from a map with a relationship of the pulsating component Tev to the crank angle θe and the initial crank angle θeset, which is the crank angle θe at an initiation of the cranking, determined in advance by a pre-experiment and analysis and stored in the ROM (not illustrated) as the map. An example of the relationship between the crank angle θe and the pulsating component Tev at a time when the crank angle θe is 0° is illustrated in FIG. 5. In the interest of simplicity, a direct current component Ted of the torque Te of the engine 22 at a time when no fuel injection and no ignition are performed on the engine 22 may be regarded as having a value of 0.

Then, it is determined whether the shift position SP is the position for traveling or the position for non-traveling (Step S140). When the shift position SP is the position for traveling, it is determined that an in-phase damping control for outputting a damping torque of the same phase as the pulsating component Tev of the torque Te of the engine 22 from the motor MG1 is to be performed. Then, a value that is obtained by multiplying the pulsating component Tev of the torque Te of the engine 22 by a positive coefficient kv1 (kv1·Tev) is set as a damping torque Tv1 (Step S150), and a value that is obtained by adding the set damping torque Tv1 to the basic torque Tm1$tmp$ is set to the torque command Tm1* of the motor MG1 (Step S160). According to the example, a value of $((1+\rho)/\rho) \cdot (Im1/Ie)$ is used as the coefficient kv1. Details of this in-phase damping control will be described later.

Figure 6:
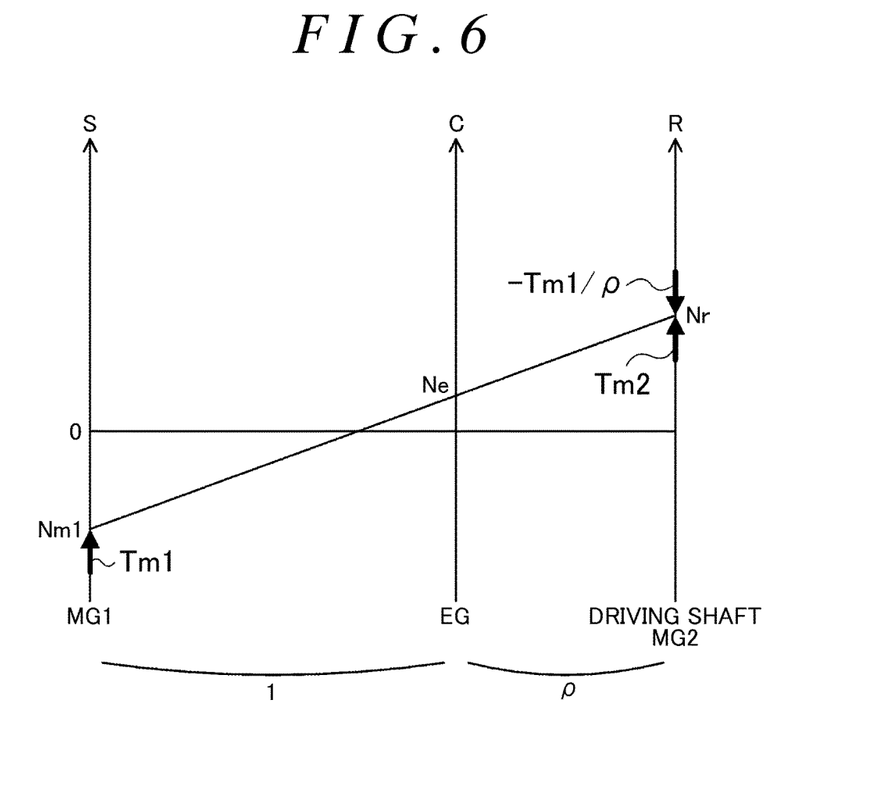
FIG. 6 is an explanatory drawing illustrating an example of a nomogram that illustrates a mechanical relationship between a rotation speed and a torque of a rotating element of a planetary gear 30 at a time when an engine 22 is cranked and started by a motor MG1 with a shift position SP at a drive position.

Then, a torque command Tm2* of the motor MG2 is calculated (Step S190), as illustrated in the following Equation (1), by subtracting a torque ($-$Tm1$tmp$/ρ) that is output from the motor MG1 and acts on the intermediate shaft 32 via the planetary gear 30 when the motor MG1 is driven at the basic torque Tm1$tmp$ from the required torque Tin* of the intermediate shaft 32. FIG. 6 is an explanatory drawing illustrating an example of a nomogram that illustrates a mechanical relationship between a rotation speed and a torque of a rotating element of the planetary gear 30 at the time when the engine is cranked and started by the motor MG1 with the shift position SP at the drive position. In the drawing, the S axis on the left represents the rotation speed of the sun gear 30s that is the rotation speed Nm1 of the motor MG1, the C axis represents the rotation speed of the carrier 30c that is the rotation speed Ne of the engine 22, and the R axis represents the rotation speed Nr of the ring gear 30r and the intermediate shaft 32 that is the rotation speed Nm2 of the motor MG2. In addition, the two bold arrows on the R axis represent the torque that is output from the motor MG1 and acts on the intermediate shaft 32 via the planetary gear 30 and a torque that is output from the motor MG2 and acts on the intermediate shaft 32. Equation (1) can be easily derived by the use of this nomogram.

$$Tm2tmp = Tin^* + Tm1tmp/\rho \quad (1)$$

After the torque commands Tm1*, Tm2* of the motors MG1, MG2 are set as described above, the set torque commands Tm1*, Tm2* of the motors MG1, MG2 are transmitted to the motor ECU 40 (Step S200). After receiving the torque commands Tm1*, Tm2* of the motors MG1, MG2, the motor ECU 40 performs the switching control on the switching elements of the inverters 41, 42 so that the motors MG1, MG2 are driven at the torque commands Tm1*, Tm2*.

Then, the rotation speed Ne of the engine 22 is compared to an operation initiation rotation speed Nsteg (Step S210). The operation initiation rotation speed Nsteg is a rotation speed at which the operation of the engine 22 (fuel injection control and ignition control) is initiated. For example, 1,000 rpm, 1,200 rpm, or the like can be used as the operation initiation rotation speed Nsteg.

When the rotation speed Ne of the engine 22 falls short of the operation initiation rotation speed Nsteg, the processing returns to Step S100 and the processing of Steps S100 to S210 is repeatedly executed. Then, when it is determined in Step S210 that the rotation speed Ne of the engine 22 becomes equal to or higher than the operation initiation rotation speed Nsteg, an initiation command for the fuel injection control and the ignition control for the engine 22 is transmitted to the engine ECU 24 (Step S220). Upon receiving this initiation command, the engine ECU 24 initiates the fuel injection control and the ignition control for the engine 22.

Then, it is determined whether or not the engine 22 has reached a complete explosion (Step S230). When the engine 22 has yet to reach the complete explosion, the processing returns to Step S100 and the processing of Steps S100 to S230 is repeatedly executed. Then, this routine is terminated once it is determined in Step S230 that the engine 22 has reached the complete explosion. As described above, when the shift position SP is the position for traveling, the engine 22 is cranked and started while the torque that is equivalent to the sum of the basic torque Tm1tmp(cranking torque Tcr) and the damping torque Tv1 is output from the motor MG1.

When the shift position SP is the position for non-traveling in Step S140, it is determined that a reverse phase damping control for outputting a damping torque opposite in phase to the pulsating component Tev of the torque Te of the engine 22 from the motor MG1 is to be performed, a value that is obtained by multiplying the pulsating component Tev of the torque Te of the engine 22 by a negative coefficient kv2 (kv2·Tev) is set as a damping torque Tv2 (Step S170), a value that is obtained by adding the set damping torque Tv1 to the basic torque Tm1tmp is set to the torque command Tm1* of the motor MG1 (Step S180), and the processing subsequent to Step S190 is executed. For example, a value of (−1) is used as the coefficient kv2. Details of the reverse phase damping control including the coefficient kv2 will be described later. As described above, when the shift position SP is the position for non-traveling, the engine 22 is cranked and started while the torque that is equivalent to the sum of the basic torque Tm1tmp(cranking torque Tcr) and the damping torque Tv2 is output from the motor MG1.

Figure 7:
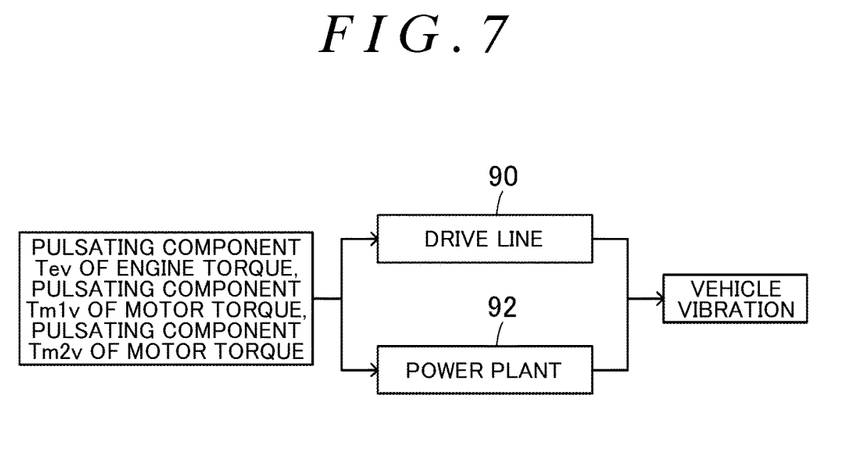
FIG. 7 is an explanatory drawing for showing how a vibration attributable to the pulsating component Tev of a torque of the engine 22, a pulsating component Tm1v of a torque of the motor MG1, and a pulsating component Tm2v of a torque of a motor MG2 at the time when the engine 22 is started appears as a vehicle vibration.
Figure 8:
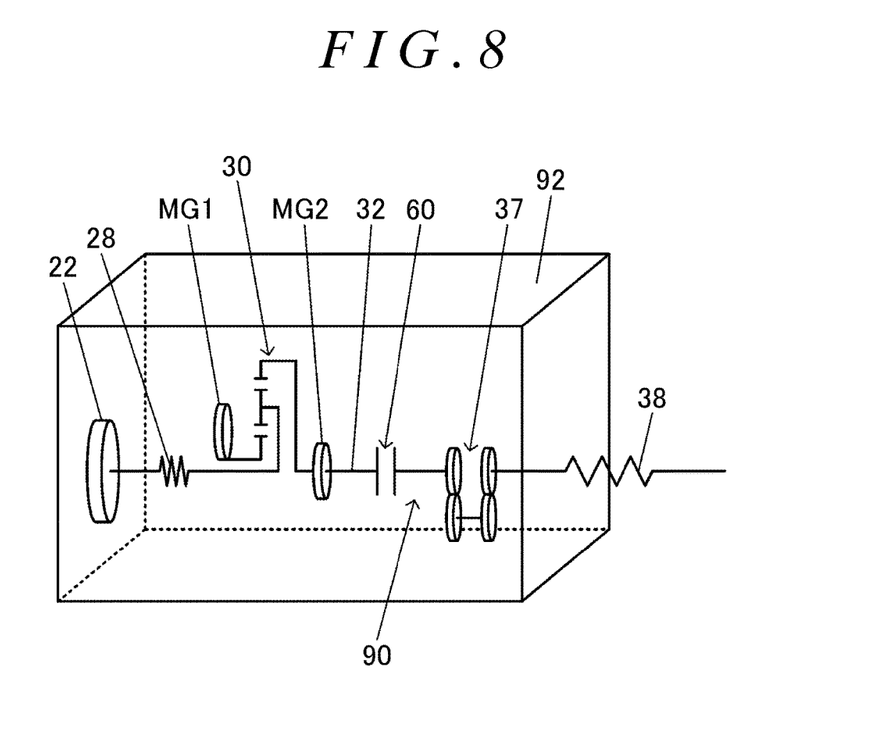
FIG. 8 is an explanatory drawing for showing how the vibration attributable to the pulsating component Tev of the torque of the engine 22, the pulsating component Tm1v of the torque of the motor MG1, and the pulsating component Tm2v of the torque of the motor MG2 at the time when the engine 22 is started appears as the vehicle vibration.

Hereinafter, the in-phase damping control and the reverse phase damping control will be described. FIGS. 7 and 8 are explanatory drawings for showing how a vibration attributable to the pulsating component Tev of the torque of the engine 22, a pulsating component Tm1v of the torque of the motor MG1, and a pulsating component Tm2v of the torque of the motor MG2 at the time when the engine 22 is started (hereinafter, referred to as a "predetermined vibration") appears as a vehicle vibration. In FIG. 7, a "drive line 90" is a transmission path from the intermediate shaft 32 to the axle with respect to the predetermined vibration and a "power plant 92" is a transmission path by a case, a mount, a suspension portion, and the like with respect to the predetermined vibration. When the shift position SP is the position for traveling, the intermediate shaft 32 and the driving shaft 36 are connected to each other and the predetermined vibration is transmitted via the drive line 90 and is transmitted via the power plant 92. In this case, the vibration via the drive line 90 is more likely to appear as the vehicle vibration than the vibration via the power plant 92. In some embodiments, when the engine 22 is started with the shift position SP being the position for traveling, the vibration input to the drive line 90 is reduced by the predetermined vibration being regulated. When the shift position SP is the position for non-traveling, in contrast, the intermediate shaft 32 and the driving shaft 36 are disconnected from each other and the predetermined vibration is transmitted only via the power plant 92 without being transmitted via the drive line 90. In addition, when the vehicle is stopped, a driver is more likely to feel the vibration than during the traveling of the vehicle. In some embodiments, when the engine 22 is started with the shift position SP being the position for non-traveling, the vibration input to the power plant 92 is reduced by the predetermined vibration being regulated.

Figure 9:
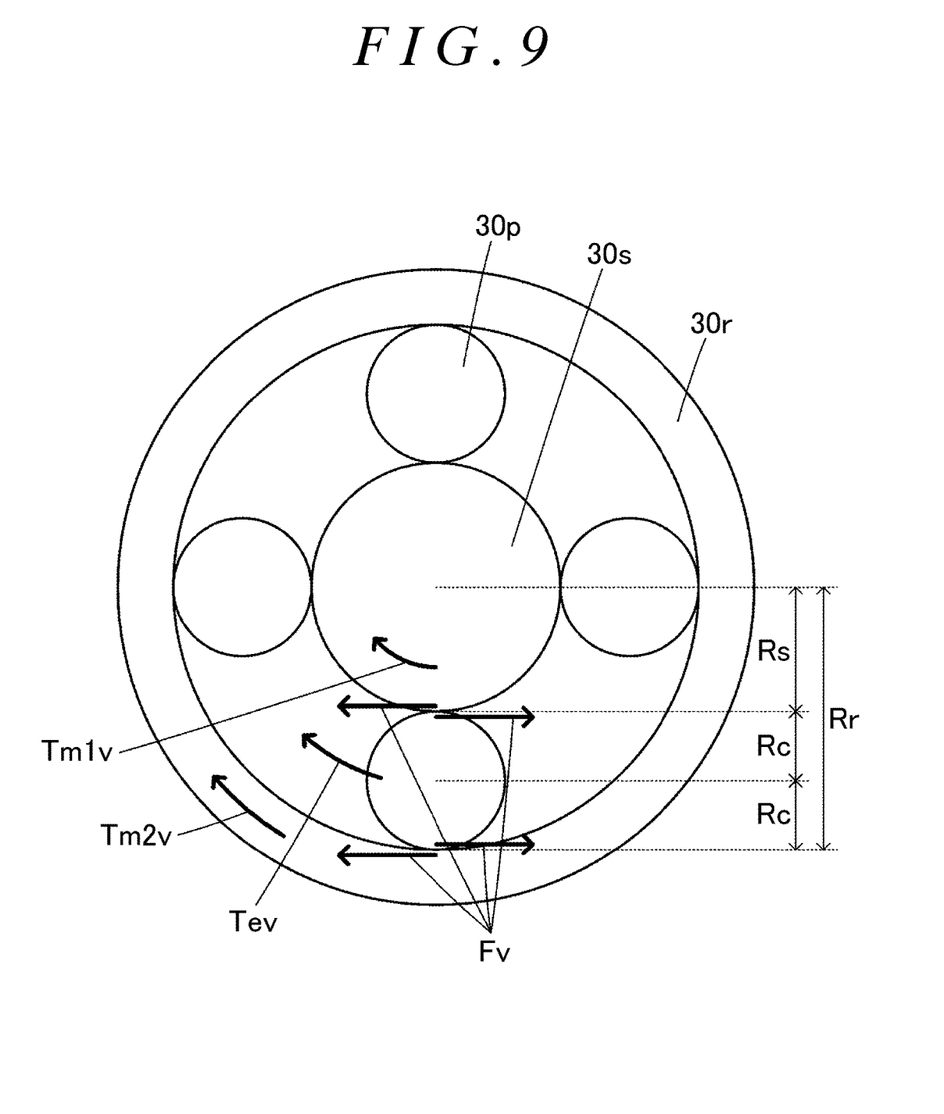
FIG. 9 is an explanatory drawing for showing a pulsating component of a force that acts on each rotating element of the planetary gear 30.

FIG. 9 is an explanatory drawing for showing a pulsating component of a force that acts on each rotating element of the planetary gear 30. In the drawing, "Rs", "Rc", and "Rr" represent respective radii of the sun gear 30s, the carrier 30c, and the ring gear 30r of the planetary gear 30. A direct current component Tm1d and the pulsating component (alternating current component) Tm1v of a torque Tm1 are conceivable as the force that is input to the sun gear 30s from the motor MG1. The direct current component Ted and the pulsating component Tev of the torque Te are conceivable as the force that is input to the carrier 30c from the engine 22. A direct current component Tm2d and the pulsating component Tm2v of a torque Tm2 are conceivable as the force that is input to the ring gear 30r from the motor MG2. In addition, a direct current component Fd and a pulsating component Fv of a meshing reaction force F by gear meshing are conceivable as the force that acts on a part where the sun gear 30s and the pinion gear 30p mesh with each other and a part where the pinion gear 30p and the ring gear 30r mesh with each other. The respective pulsating components of these forces are regarded as contributing to the vehicle vibration, and thus the respective pulsating components are illustrated in FIG. 9. The direct current component Tm1d of the torque Tm1 of the motor MG1 corresponds to the basic torque Tm1tmp (=Tcr) described above, and the direct current component Tm2d of the torque Tm2 of the motor MG2 corresponds to the torque command Tm2* described above. In addition, in the interest of simplicity, the direct current component Ted of the torque Te of the engine 22 at a time when no fuel injection and no ignition are performed on the engine 22 may be regarded as having a value of 0 as described above.

An equation of motion in the form of the following Equation (2) is obtained from FIG. 9 by the use of a moment of inertia Ie and an angular acceleration of the engine 22 (second-order differential of the crank angle θe), the pulsating component Tev of the torque Te, the pulsating component Fv of the meshing reaction force F, the radius Rs of the sun gear 30s, and the radius Rr of the ring gear 30r. In addition, an equation of motion in the form of Equation (3) is obtained by the use of a moment of inertia Im1 and an angular acceleration of the motor MG1 (second-order differential of the rotational position θm1), the pulsating component Tm1v of the torque Tm1, the pulsating component Fv of the meshing reaction force F, and the radius Rs of the sun gear 30s. Furthermore, an equation of motion in the form of Equation (4) is obtained by the use of a moment of inertia Im2 and an angular acceleration of the motor MG2 (second-order differential of the rotational position θm2), the pulsating component Tm2v of the torque Tm2, the pulsating component Fv of the meshing reaction force F, and the radius Rr of the ring gear 30r. Moreover, a relationship in the form of Equation (5) is obtained by the use of a gear ratio ρ of the planetary gear 30, the crank angle θe of the engine 22, the rotational position θm1 of the rotor of the motor MG1, and the rotational position θm2 of the rotor of the motor MG2.

$$Ie \cdot \ddot{\theta}e = Tev - Fv \cdot Rr\left(\frac{Rs}{Rr} + 1\right) \quad (2)$$

$$Im1 \cdot \ddot{\theta}m1 = Tm1v + Fv \cdot Rs \quad (3)$$

$$Im2 \cdot \ddot{\theta}m2 = Tm2v + Fv \cdot Rr \quad (4)$$

$$(1 + \rho) \cdot \theta e = \theta m2 + \rho \cdot \theta m1 \quad (5)$$

In some embodiments, as described above, when the engine 22 is started with the shift position SP being the position for traveling, the vibration input to the drive line 90 is reduced by the predetermined vibration being regulated. In order for the vibration input to the drive line 90 to become zero, the angular acceleration of the motor MG2 (second-order differential of the rotational position θm2) may be a value of 0 such that the motor MG2 does not rotate and the pulsating component Fv of the meshing reaction force F may be a value of 0. In Equation (4), the pulsating component Tm2v of the torque Tm2 of the motor MG2 becomes a value of 0 when the angular acceleration of the motor MG2 (second-order differential of the rotational position θm2) becomes a value of 0 and the pulsating component Fv of the meshing reaction force F becomes a value of 0. In view of this, in Step S190 of the routine in FIG. 4B, the torque command Tm2* of the motor MG2 is set without the pulsating component Tm1v of the torque Tm1 of the motor MG1 (damping torques Tv1, Tv2) being taken into account. In addition, in Equation (2) and Equation (3), the second term on the right-hand side becomes a value of 0 when the pulsating component Fv of the meshing reaction force F becomes a value of 0. The following Equation (6) is obtained when Equation (2), Equation (3), and Equation (5) are organized. The pulsating component Tm1v in this Equation (6) corresponds to the damping torque Tv1 described above, and thus it is understood that the value of $((1+\rho)/\rho)\cdot(Im1/Ie)$ may be used as the coefficient kv1. This coefficient kv1 is a positive value, and thus the pulsating component Tev of the torque Te of the engine 22 and the pulsating component Tm1v of the torque Tm1 of the motor MG1 are of the same phase. Accordingly, it is conceivable that a torque which is attributable to a distortion of a part between the engine 22 and the motor MG1 (damper 28, each rotary shaft, or the like) can be suppressed and a rotation of the intermediate shaft 32 can be suppressed by the distortion being suppressed.

$$Tm1v = \left(\frac{1+\rho}{\rho} \cdot \frac{Im1}{Ie}\right) \cdot Tev \quad (6)$$

In some embodiments, as described above, the vibration input to the power plant 92 is reduced by the predetermined vibration being regulated when the engine 22 is started with the shift position SP being the position for non-traveling. Herein, the following Equation (7) is satisfied as a relational expression relating to the vibration input to the power plant 92 by the use of a moment of inertia Ipp, a rotational position θpp, and an angular velocity (second-order differential of the rotational position θpp) of the power plant 92, the pulsating component Tev of the torque Te of the engine 22, the pulsating component Tm1v of the torque Tm1 of the motor MG1, the pulsating component Tm2v of the torque Tm2 of the motor MG2, a differential ratio N of the differential gear 37, a spring constant Kds of the axle 38, and the rotational position θm2 of the rotor of the motor MG2. In Equation (7), "−Tev−Tm1v−Tm2v" on the right-hand side is a pulsating component of a reaction force against the torques of the engine 22, the motor MG1, and the motor MG2, and the rest of the right-hand side is a driving reaction force (reaction force by a distortion of the axle 38). When the shift position SP is the position for non-traveling, the intermediate shaft 32 and the driving shaft 36 are disconnected from each other, and thus the term of the driving reaction force can be ignored. Accordingly, in order for the vibration input to the power plant 92 to become zero, an angular acceleration of the power plant 92 (second-order differential of the rotational position θpp) may be a value of 0 so that the power plant 92 does not rotate. In other words, "−Tev−Tm1v−Tm2v=0" may be allowed to be satisfied. As described above, in Step S190 of the routine in FIG. 4B, the torque command Tm2* of the motor MG2 is set without the pulsating component Tm1v of the torque Tm1 of the motor MG1 (damping torques Tv1, Tv2) being taken into account, and thus the pulsating component Tm2v is a value of 0. Accordingly, "Tm1v=−Te" may be satisfied. This pulsating component Tm1v corresponds to the damping torque Tv2 described above, and thus it is understood that a value of (−1) may be used as the coefficient kv2. Because the coefficient kv2 is a negative value, the pulsating component Tev of the torque Te of the engine 22 and the pulsating component Tm1v of the torque Tm1 of the motor MG1 are opposite in phase to each other.

If the value of $((1+\rho)/\rho)\cdot(Im1/Ie))$ is used as the coefficient kv2 as in a case where the shift position SP is the position for traveling, Equation (8) is obtained, according to which the vibration input to the power plant 92 might become rather significant and the vibration generated in the vehicle might become relatively significant.

$$Ipp \cdot \ddot{\theta}pp = -Tev - Tm1v - Tm2v - \frac{1-N}{N^2} \cdot Kds \cdot \{\theta m2 - (1-N) \cdot \theta pp\} \quad (7)$$

$$Ipp \cdot \ddot{\theta}pp = -\left(1 + \frac{1+\rho}{\rho} \cdot \frac{Im1}{Ie}\right) \cdot Tev \quad (8)$$

In the hybrid car 20 described above, the in-phase damping control is executed by the motor MG1 When the engine 22 is started with the shift position SP being the position for traveling (drive position or reverse position) and the reverse phase damping control is executed by the motor MG1 when the engine 22 is started with the shift position SP being the position for non-traveling (neutral position or parking position). Accordingly, when the engine 22 is started, a relative increase in the vibration generated in the vehicle can be suppressed in accordance with the shift position SP (whether or not the intermediate shaft 32 and the driving shaft 36 are connected to each other).

In the hybrid car 20 according to the example, the value that is obtained by multiplying the pulsating component Tev of the torque Te of the engine 22 by the value of $((1+\rho)/\rho) \cdot (Im1/Ie))$ as the coefficient kv1 is used as the damping torque Tv1 when the engine 22 is started with the shift position SP being the position for traveling. However, the damping torque Tv1 is not limited thereto and can be appropriately set insofar as the damping torque Tv1 is a torque of the same phase as the pulsating component Tev of the torque Te of the engine 22.

In the hybrid car 20 according to the example, the value that is obtained by multiplying the pulsating component Tev of the torque Te of the engine 22 by the value of (−1) as the coefficient kv2 is used as the damping torque Tv2 when the engine 22 is started with the shift position SP being the position for non-traveling. However, the damping torque Tv2 is not limited thereto and can be appropriately set insofar as the damping torque Tv2 is a torque opposite in phase to the pulsating component Tev of the torque Te of the engine 22.

In the hybrid car 20 according to the example, the in-phase damping control is executed by the motor MG1 when the engine 22 is started with the shift position SP being the position for traveling and the reverse phase damping control is executed by motor MG1 when the engine 22 is started with the shift position SP being the position for non-traveling. However, both the in-phase damping control and the reverse phase damping control may not be executed when the engine 22 is started with the shift position SP being the position for non-traveling. Even in this case, a relative increase in the vibration generated in the vehicle can be more suppressed than in a case where the in-phase damping control is executed when the engine 22 is started with the shift position SP being the position for non-traveling.

In the hybrid car 20 according to the example, the torque command Tm2* of the motor MG2 is calculated by the torque $(-Tm1tmp/\rho)$ that is output from the motor MG1 and acts on the intermediate shaft 32 via the planetary gear 30 when the motor MG1 is driven at the basic torque Tm1$tmp$ being subtracted from the required torque Tin* of the intermediate shaft 32. However, the torque command Tm2* of the motor MG2 may also be calculated by a torque $(-Tm1*/\rho)$ that is output from the motor MG1 and acts on the intermediate shaft 32 via the planetary gear 30 when the motor MG1 is driven at the torque command Tm1* being subtracted from the required torque Tin* of the intermediate shaft 32. In addition, when the shift position SP is the position for non-traveling, the intermediate shaft 32 and the driving shaft 36 are disconnected from each other, and thus the motor MG1 and the motor MG2 may be controlled such that the engine 22 is cranked by an increase in the rotation speeds of the motor MG1 and the motor MG2.

In the hybrid car 20 according to the example, the four-cylinder engine 22 is used. However, a six-cylinder engine, an eight-cylinder engine, a 12-cylinder engine, and the like may be used instead.

In the hybrid car 20 according to the example, the four-speed transmission is used as the stepped transmission 60. However, a two-speed transmission, a three-speed transmission, a five-speed transmission, a six-speed transmission, and the like may be used instead.

Figure 10:
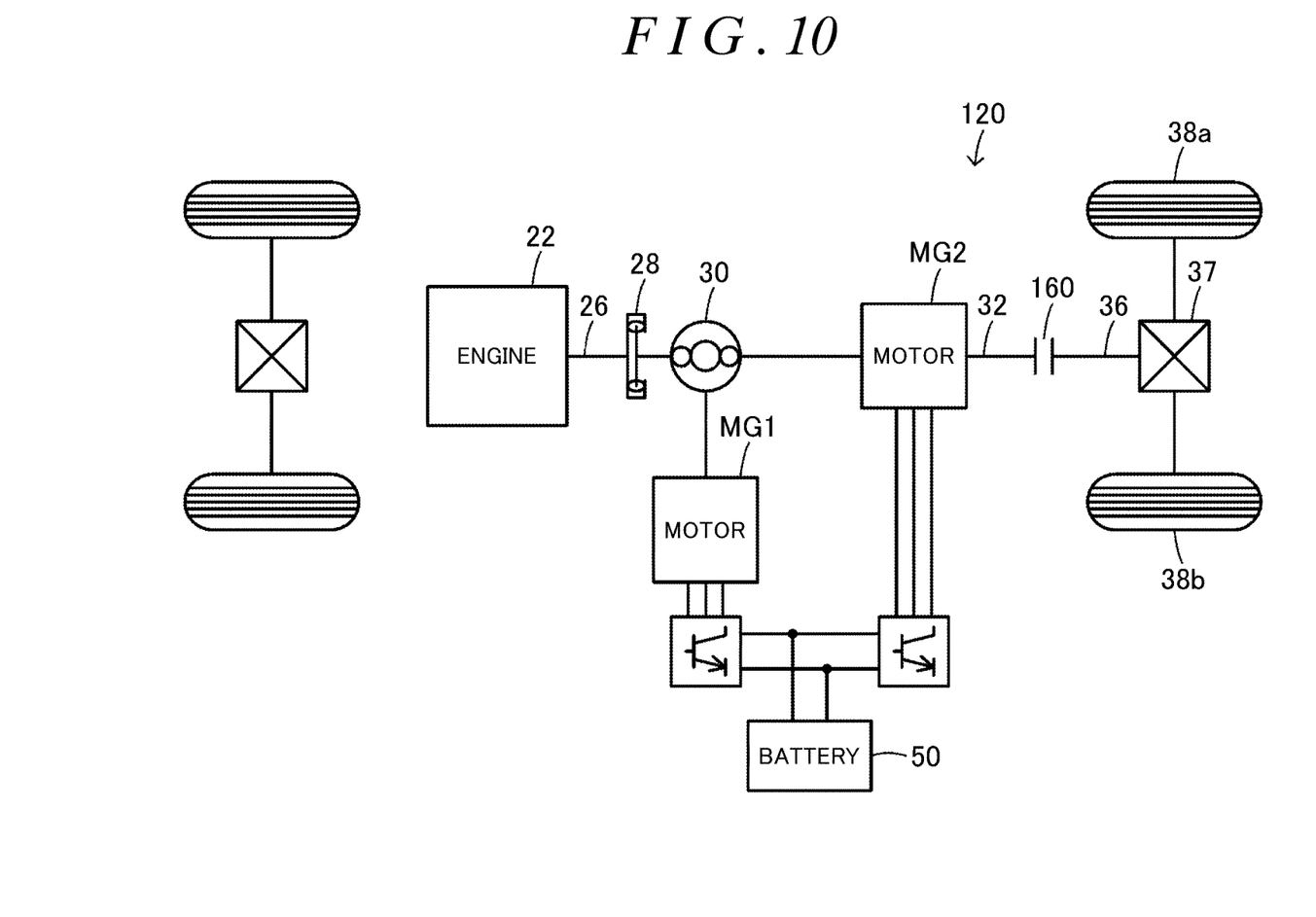
FIG. 10 is a configuration diagram illustrating a schematic configuration of a hybrid car 120 according to a modification example.

In the hybrid car 20 according to the example, the stepped transmission 60 is interposed between the intermediate shaft 32 and the driving shaft 36. However, a clutch 160 may be interposed between the intermediate shaft 32 and the driving shaft 36 as in the example of a hybrid car 120 according to a modification example that is illustrated in FIG. 10.

A correspondence relationship between the main elements of the example and the main elements of the present disclosure described in the SUMMARY will be described. The engine 22 according to the example corresponds to the "engine", the motor MG1 according to the example corresponds to the "first motor", the planetary gear 30 according to the example corresponds to the "planetary gear", the motor MG2 according to the example corresponds to the "second motor", the stepped transmission 60 according to the example corresponds to the "disconnecting mechanism", and the HVECU 70, the engine ECU 24, and the motor ECU 40 according to the example correspond to the "control means".

The correspondence relationship between the main elements of the example and the main elements of the present disclosure described in the SUMMARY does not limit the elements of the present disclosure described in the SUMMARY because the example is an example for the specific description of the embodiment of the present disclosure described in the SUMMARY. In other words, interpretation of the present disclosure described in the SUMMARY should be performed based on the description of the SUMMARY and the example is merely a specific example of the present disclosure described in the SUMMARY.

The embodiment of the present disclosure has been described by the use of the example above. The present disclosure is not limited to the example at all. As a matter of course, the present disclosure can be implemented in various forms without departing from the spirit of the present disclosure.

The present disclosure can be used in the hybrid car manufacturing industry and the like.

What is claimed is:

1. A hybrid car comprising:
   an engine;
   a first motor configured to input and output power;
   a second motor configured to input and output power to and from an intermediate shaft;
   a planetary gear including three rotating elements each connected to a rotary shaft of the first motor, an output shaft of the engine, and the intermediate shaft, the planetary gear being configured such that the rotary shaft, the output shaft, and the intermediate shaft are arranged in the order of the rotary shaft, the output shaft, and the intermediate shaft in a nomogram of the planetary gear;
   a disconnecting mechanism configured to execute connection and disconnection between the intermediate shaft and a driving shaft connected to an axle; and
   an electronic control unit configured to control the disconnecting mechanism such that the intermediate shaft and the driving shaft are connected to each other when a shift position is a position for traveling, the electronic control unit being configured to control the disconnecting mechanism such that the intermediate shaft and the driving shaft are disconnected from each other when the shift position is a position for non-traveling, the electronic control unit being configured to control the engine and the first motor such that the first motor gives the engine a damping torque of the same phase as a pulsating component of a torque of the engine and the first motor starts the engine by cranking the engine when the engine is started with the shift position being the position for traveling, and the electronic control unit being configured to control the engine and the first motor such that the first motor starts the engine by cranking the engine without the first motor giving the engine the damping torque of the same phase when the engine is started with the shift position being the position for non-traveling, wherein the electronic control unit is configured to control the engine and the first motor such that the first motor gives the engine a damping torque opposite in phase to the pulsating component of the torque of the engine and the first motor starts the engine by cranking the engine when the engine is started with the shift position being the position for non-traveling, wherein the electronic control unit is configured to control the first motor and the second motor such that the first motor outputs a torque equivalent to a sum of a basic torque for cranking the engine and the damping torque of the same phase and the second motor outputs a cancel torque for cancelling a torque acting on the intermediate shaft in accordance with the basic torque from the first motor when the engine is started with the shift position being the position for traveling and the electronic control unit is configured to control the first motor and the second motor such that the first motor outputs a torque equivalent to a sum of the basic torque and the damping torque of the opposite phase and the second motor outputs the cancel torque when the engine is started with the shift position being the position for non-traveling.

2. The hybrid car according to claim 1,
wherein the damping torque of the same phase satisfies the following equation, $$Tm1v = \left( \frac{1+\rho}{\rho} \cdot \frac{Im1}{Ie} \right) \cdot Tev$$

and wherein the damping torque of the opposite phase satisfies the following equation, $$Tm1v = -Tev$$

in which $\rho$ is a gear ratio of the planetary gear, Ie is a moment of inertia of the engine, Im1 is a moment of inertia of the first motor, Tev is the pulsating component of the torque of the engine, and Tm1v is the damping torque of the same phase or the opposite phase of the first motor.

3. The hybrid car according to claim 1,
wherein the disconnecting mechanism is a stepped transmission interposed between the intermediate shaft and the driving shaft.

* * * * *